(12) United States Patent
Dash et al.

(10) Patent No.: US 12,265,964 B2
(45) Date of Patent: Apr. 1, 2025

(54) SECURE ELECTRONIC CHECK (E-CHECK) CLEARANCE PLATFORM WITH INTEGRATED DISTRIBUTED HASH TABLE

(71) Applicant: Bank of America Corporation, Charlotte, NC (US)

(72) Inventors: Bikash Dash, Hyderabad (IN); Meera Lakshmi, Chennai (IN)

(73) Assignee: Bank of America Corporation, Charlotte, NC (US)

(*) Notice: Subject to any disclaimer, the term of this patent is extended or adjusted under 35 U.S.C. 154(b) by 293 days.

(21) Appl. No.: 17/891,191

(22) Filed: Aug. 19, 2022

(65) Prior Publication Data

US 2024/0062207 A1 Feb. 22, 2024

(51) Int. Cl.
G06Q 20/40 (2012.01)
G06Q 20/02 (2012.01)
G06Q 20/04 (2012.01)
G06Q 20/38 (2012.01)

(52) U.S. Cl.
CPC ..... *G06Q 20/40145* (2013.01); *G06Q 20/023* (2013.01); *G06Q 20/0425* (2013.01); *G06Q 20/3827* (2013.01); *G06Q 20/3829* (2013.01); *G06Q 2220/00* (2013.01)

(58) Field of Classification Search
CPC .......... G06Q 20/40145; G06Q 20/023; G06Q 20/0425; G06Q 20/3827; G06Q 20/3829; G06Q 2220/00

USPC .......................................................... 705/66
See application file for complete search history.

(56) References Cited

U.S. PATENT DOCUMENTS

| | | | |
|---|---|---|---|
| 7,113,925 B2 | 9/2006 | Waserstien et al. | |
| 8,374,963 B1 | 2/2013 | Billman | |
| 2021/0110387 A1* | 4/2021 | Edington | G06F 7/14 |
| 2021/0357489 A1* | 11/2021 | Tali | G06F 16/2379 |
| 2022/0222678 A1* | 7/2022 | Ferenczi | G06Q 20/3829 |
| 2023/0281604 A1* | 9/2023 | Robell | G06Q 30/018 |
| 2024/0177527 A1* | 5/2024 | Jiao | G06T 7/70 |

* cited by examiner

*Primary Examiner* — Courtney P Jones
(74) *Attorney, Agent, or Firm* — Weiss & Arons LLP

(57) ABSTRACT

Systems, methods, and apparatus are provided for expedited e-check processing via a universal clearance platform. In response to e-check initiation, a captured biometric marker may be uploaded to the clearance platform along with the e-check data. The platform may mint the biometric marker and e-check data as NFTs. The platform may insert the NFTs as a key-value pair in an integrated DHT. The biometric marker may be the key and the e-check data may be stored as the corresponding value. The platform may validate the key against previously captured biometric information and map the validated key to the corresponding value via an overlay network associated with the DHT. The platform may validate the retrieved e-check data against a previously captured transaction history to clear the e-check. In response to e-check clearance, the platform may route the e-check data to the ACH network to complete the transfer.

19 Claims, 4 Drawing Sheets

SECURE ELECTRONIC CHECK (E-CHECK) CLEARANCE PLATFORM WITH INTEGRATED DISTRIBUTED HASH TABLE

FIELD OF TECHNOLOGY

Aspects of the disclosure relate to e-check clearance security protocols.

BACKGROUND OF THE DISCLOSURE

An electronic check (e-check) is a digital version of a paper check. E-checks use the automated clearing house (ACH) network for electronic transactions that move funds from a payor account into a payee account.

Existing transaction processing methods for e-checks include a wide range of disparate authorization requirements, depending on the parameters of the transaction. Parameters may include the mode of interaction with the payor. For example, a telephone-based transaction may include different protocols from a web-based transaction. Other parameters may include whether the transaction is credit or debit based and whether it is consumer or corporate.

It would be desirable to improve e-check processing by implementing a single, universal, biometric authorization requirement for all modes of interaction. It would be desirable to combine this biometric input with both non-fungible token (NFT) and distributed hash table (DHT) technologies to improve security and accelerate processing times.

SUMMARY OF THE DISCLOSURE

Systems, methods, and apparatus for expedited e-check processing via a universal clearance platform are provided.

A biometric marker and e-check data may be uploaded to the clearance platform. The platform may watermark the uploads using wavelet transforms.

The platform may mint the biometric marker as a first NFT and the e-check data as a second NFT. The platform may insert the first NFT and second NFT as a key-value pair in the distributed hash table. The biometric marker may be stored as the key and the e-check data may be stored as the corresponding value.

The platform may validate the biometric marker key against previously captured biometric information and map the validated biometric marker key to the e-check data value via an overlay network associated with the distributed hash table. The platform may validate the retrieved e-check data value against a previously captured transaction history to clear the e-check.

In response to e-check clearance, the platform may transmit the e-check data to the ACH network to complete the transfer.

These protocols for universal e-check clearance are a practical application that improves both security and processing speed by integrating NFT and DHT technologies. By securing the biometric marker and the e-check data as a key/value pair, the DHT not only shields the information during processing, but also adapts the network retrieval protocols to confirm the authenticity of the biometric key.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
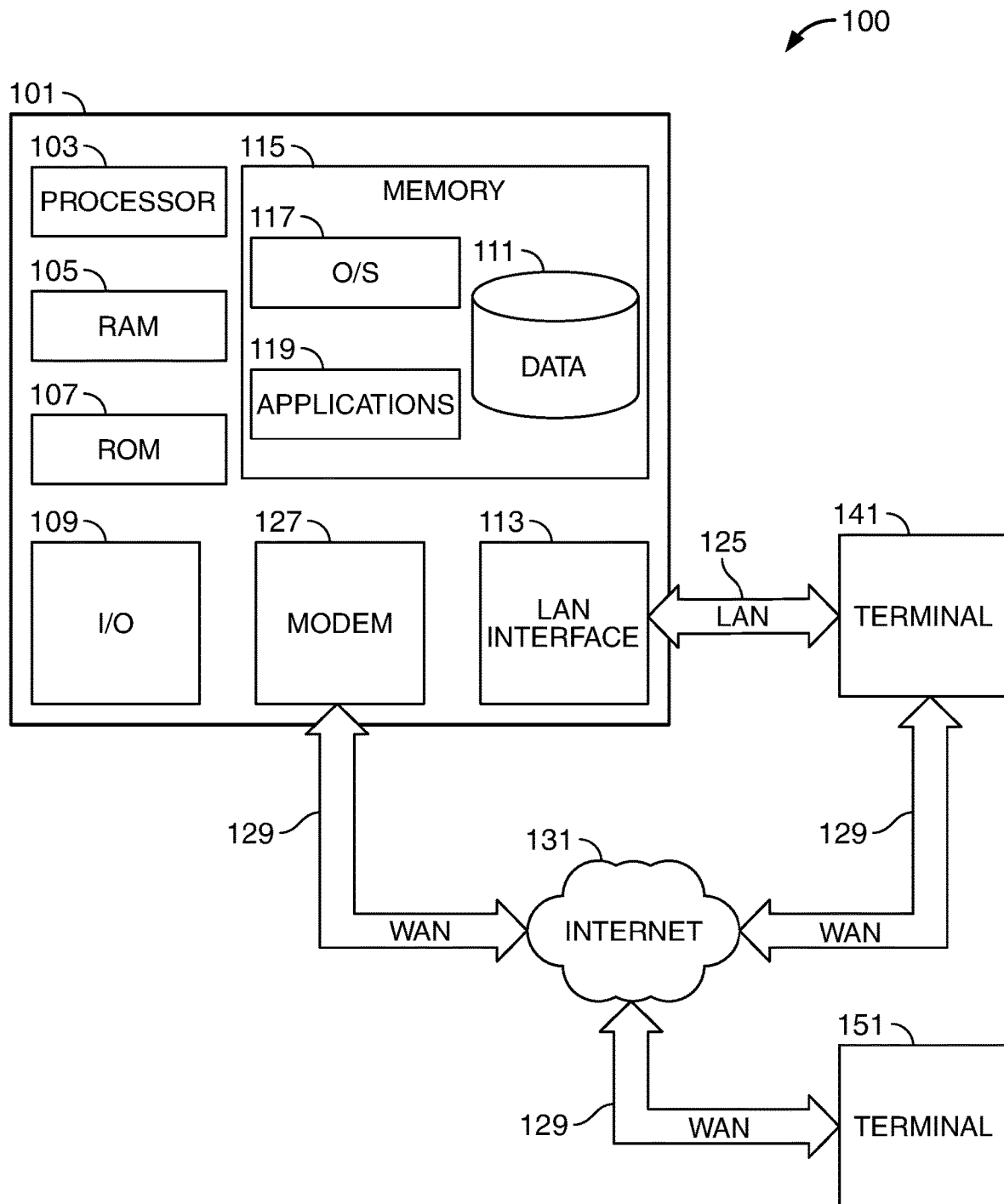
FIG. 1 shows illustrative apparatus in accordance with principles of the disclosure.

Systems, methods, and apparatus for expedited e-check processing via a universal clearance platform are provided.

For the sake of illustration, the invention will be described as being performed by a "system." The system may include one or more features of apparatus and methods that are described herein and/or any other suitable device or approach.

Routing of e-check funds is typically carried out using the automated clearance house (ACH) network. Different types of ACH transactions are typically identified by their Standard Entry Class (SEC) codes. Each code is a 3-letter string that provides information about whether the entry is consumer or commercial, whether the entry is single or recurring, as well as the authorization requirements. Commonly used ACH SEC codes include PPD (prearranged payment and deposit), TEL (telephone-initiated entry), WEB (internet-initiated entry), and CCD (corporate credit or debit entry).

Each type of e-check transaction may require a different authorization protocol. Authorizations may be written, verbal or electronic. For example, TEL entries may require authorization by phone and WEB entries may require an electronic authorization. Illustrative authorizations may include a signed contract, authorization form, or order form, an acceptance of website terms and conditions, or a recorded phone conversation that includes verbal consent.

A universal payor authorization requirement for all modes of interaction would streamline e-check processing. The system may include a single biometric authorization for all transaction types. Illustrative biometric identifiers may include a fingerprint, iris scan, facial recognition, palm scan, voiceprint, or any suitable identifier.

The system may receive a request to initiate an e-check transaction. In response to initiation of the e-check transaction, the system may initiate a biometric authorization protocol. The system may capture a biometric input. The biometric input may be received via any suitable channel. Illustrative channels include a mobile device application, a web portal, a telephone interaction, a banking center, or any suitable channel.

The biometric input may be validated using a liveness detection algorithm. Liveness detection is a security feature that protects against spoofing attacks on biometric systems. The liveness detection algorithm may determine whether a fingerprint, facial image, or other biometric input is genuine and taken from a live individual present at the time of capture.

The system may upload the validated biometric input and the e-check data to an e-check clearance platform. The e-check data may include an e-check amount, payor account information, bank routing information, payee account information, and any other suitable data.

The e-check clearance platform may watermark the biometric input and the e-check data to protect the privacy of the data during processing. Watermarking may include applying lifting wavelet transform (LWT) algorithms and/or discrete wavelet transform (DWT) algorithms.

The watermarked biometric input and e-check data may be secured using NFT technology. NFTs are digitally unique identifiers that may be used to mark a piece of digital data. NFTs may be trackable using a public ledger such as a blockchain. NFTs may be minted through smart contracts that assign ownership and manage transferability.

The e-check clearance platform may use smart contract logic ERC-1155 to mint the NFTs. ERC-1155 standards allow a single smart contract to represent multiple tokens at once. However, any suitable smart contract logic conforming to any suitable standard may be applied.

The e-check clearance platform may include an integrated DHT. A hash table is a data structure that maps keys to values. A hashing function may compute keys that are paired with values. The key is inserted into a table and may later be used to retrieve the associated value. A DHT is a hash table that is distributed across many linked nodes which cooperate to form a single cohesive hash table service. Nodes are linked by an overlay network.

The DHT overlay network serves as a large key/value store to manage data during processing and to retrieve and validate data based on the needs of each transaction. The multi-step DHT retrieval requirements add layers of security to the clearance platform. The clearance platform is resistant to hacking because there is no way to know where the information is stored among the distributed nodes and no way to determine the format for the information.

The biometric data NFT and the e-check data NFT may be inserted into the DHT. The NFTs may form a key/value pair. The biometric data NFT may be the key and the e-check data NFT may be the associated value.

Generating the NFTs at the platform may function as an e-check processing request. The system may immediately validate the biometric key by searching other keys in the network. Finding a match may result in a confirmation that the processing request is a valid request from a valid customer.

The platform may access a database storing biometric information that was previously captured from the payor. The platform may validate the biometric key by matching it against the previously stored biometric information.

In some embodiments, the validated key may be used to retrieve the corresponding value from the DHT. In some embodiments, the platform may apply a hashing algorithm to the previously captured biometric information. The system may use an MD5 message digest algorithm or any suitable hashing algorithm.

The platform may use the hashing algorithm to retrieve the corresponding value (the e-check data) from the DHT. If the previously stored biometric information does not correspond to the biometric information that was submitted with the e-check, the retrieval will fail, and the transaction will be declined.

DHT technology enhances the security of the platform on multiple levels. Key/value pairs are distributed across multiple nodes and values cannot be located without the correct key. Additionally, the platform leverages the key/value pairing of the distributed hash table to authenticate the biometric input accompanying the e-check. A version of the key generated from the previously stored input must match the version submitted with the e-check, or it will not function to obtain the corresponding value from the table.

In some embodiments, the retrieved value may be subject to additional authentication methods. Machine learning models may be trained to compare the e-check transaction data against historical patterns associated with the payor. Machine learning models may include regression, classification, cluster analysis or any suitable machine learning algorithms. In some embodiments, a machine learning model may incorporate multiple machine learning algorithms. The multiple algorithms may be applied selectively or may be applied in sequence.

In response to validation of the biometric key and subsequent retrieval and validation of the e-check data value, the e-check may be cleared. Following clearance, the e-check transaction may be processed through the ACH network and the funds may be deposited in the payee account.

The security and scalability of the integrated NFT and DHT technologies are especially suitable for open distributed banking scenarios. Open banking is a system in which banks open their APIs and allow third parties to access customer data to develop new apps and services. However, the open banking economy also involves privacy and security risks. The many integrated security features of the e-check clearance platform provide a secure solution to interactions with third party applications.

The clearance platform may integrate multiple interconnected layers of security frameworks. A first layer of security may apply watermarking to the biometric data and e-check data to shield it during processing. A second layer of security may mint the biometric data and e-check data as NFTs using smart contract logic to protect the integrity of the data.

A third layer of security may leverage features of the DHT to store the NFTs as a key/value pair. The distributed nodes of the DHT provide secure storage because there is no way to anticipate the location and format of the data. A fourth layer of security may validate the biometric key against payor data previously stored in the system. A fifth layer of security may leverage DHT retrieval. When the hashing algorithm is applied to the previously stored payor biometrics it will not map to the e-check data unless it is a match to the biometrics that were collected as part of the transaction and stored as part of the key/value pair. A sixth layer of security may apply machine learning to validate the retrieved e-check data. The integrated DHT network enables the platform to implement these enhanced security protections while at the same time improving processing speeds and completing e-check clearance within seconds.

One or more non-transitory computer-readable media storing computer-executable instructions are provided. When executed by a processor on a computer system, the instructions perform a method for expedited electronic check (e-check) processing using a universal security protocol.

The method may include uploading a biometric marker and e-check data to a clearance platform. The method may include minting the biometric marker as a first NFT and the e-check data as a second NFT.

The method may include, using a hash function, inserting the first NFT and second NFT as a key-value pair in a distributed hash table. The biometric marker NFT may be stored as the key the e-check data NFT may be stored as the corresponding value.

The method may include validating the biometric marker key against previously captured biometric information. The method may include mapping the validated biometric marker key to the e-check data value via an overlay network associated with the distributed hash table. If the key fails to retrieve the corresponding value, the clearance may fail.

If the key succeeds in retrieving the value, the method may include validating the e-check data against a previously captured transaction history to clear the e-check. In response to the e-check clearance, the e-check data may be routed to the ACH network to complete the transfer.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of watermarking data, minting an NFT, inserting a key/value pair into a DHT, validating a hash table key, retrieving a hash table value, validating a hash table value using machine learning, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
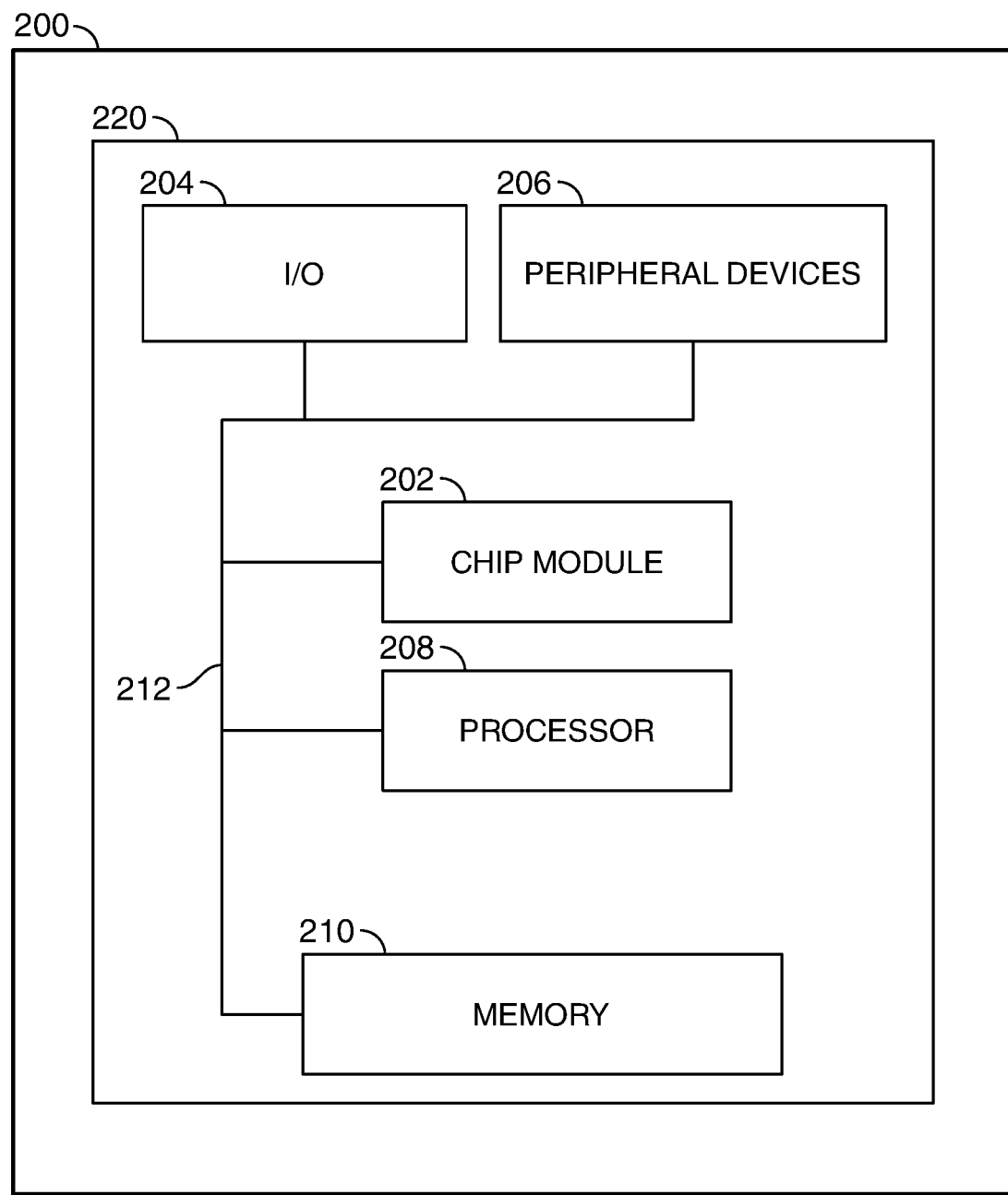
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may watermark data, mint an NFT, insert a key/value pair into a DHT, validate a hash table key, map a key to a hash table value, validate a hash table value using machine learning, and perform other methods described herein; and machine-readable memory 210.

Machine-readable memory 210 may be configured to store in machine-readable data structures: biometric data, transaction data, NFTs, hash keys, hash values, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
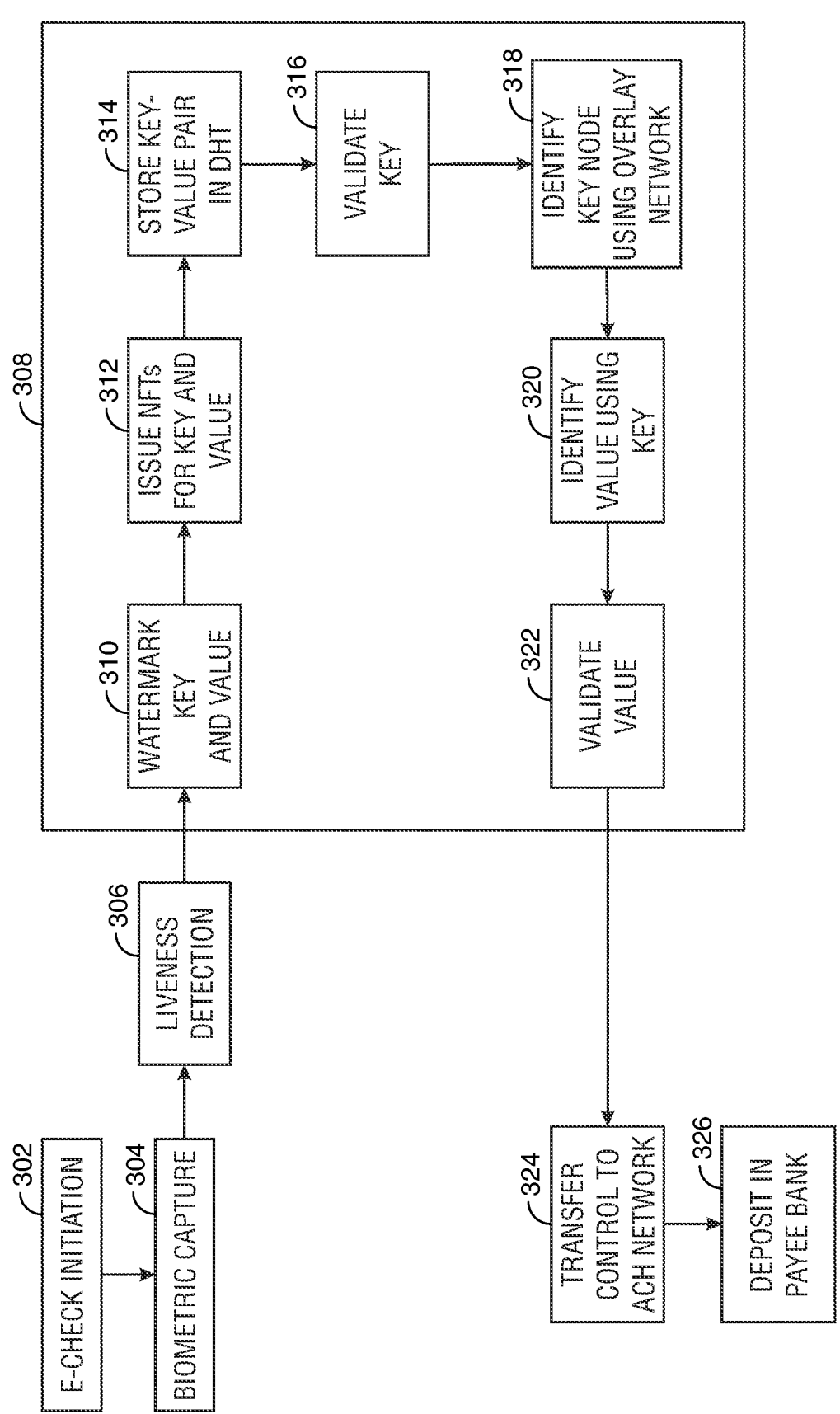
FIG. 3 shows an illustrative process flow in accordance with principles of the disclosure.

FIG. 3 shows process flow 300 for e-check clearance. At step 302, an e-check is initiated. At step 304, a biometric capture is initiated. At step 306, the biometric input is evaluated for liveness. The biometric input and e-check data are uploaded to intelligent, secure e-check clearance platform 308.

At step 310, the biometric input and the e-check data are watermarked using LWT and/or DWT to enhance data privacy during processing. At step 312, the biometric input and the e-check data are minted as NFTs using smart contract logic.

At step 314, the NFTs are stored as a key/value pair in a DHT. A hashing algorithm may map the biometric input key to the e-check value. At step 316, the platform validates the key against previously stored payor information. At step 318, the key node is located using the overlay network. At step 320, the key is mapped to the value. At step 322, the value is validated using machine learning. The machine learning algorithm may be trained using historical transaction data. Based on the result of the validation, the platform may clear the e-check.

At step 324, the platform may transfer control to the ACH network. At step 326, the funds may be deposited in the payee bank.

Figure 4:
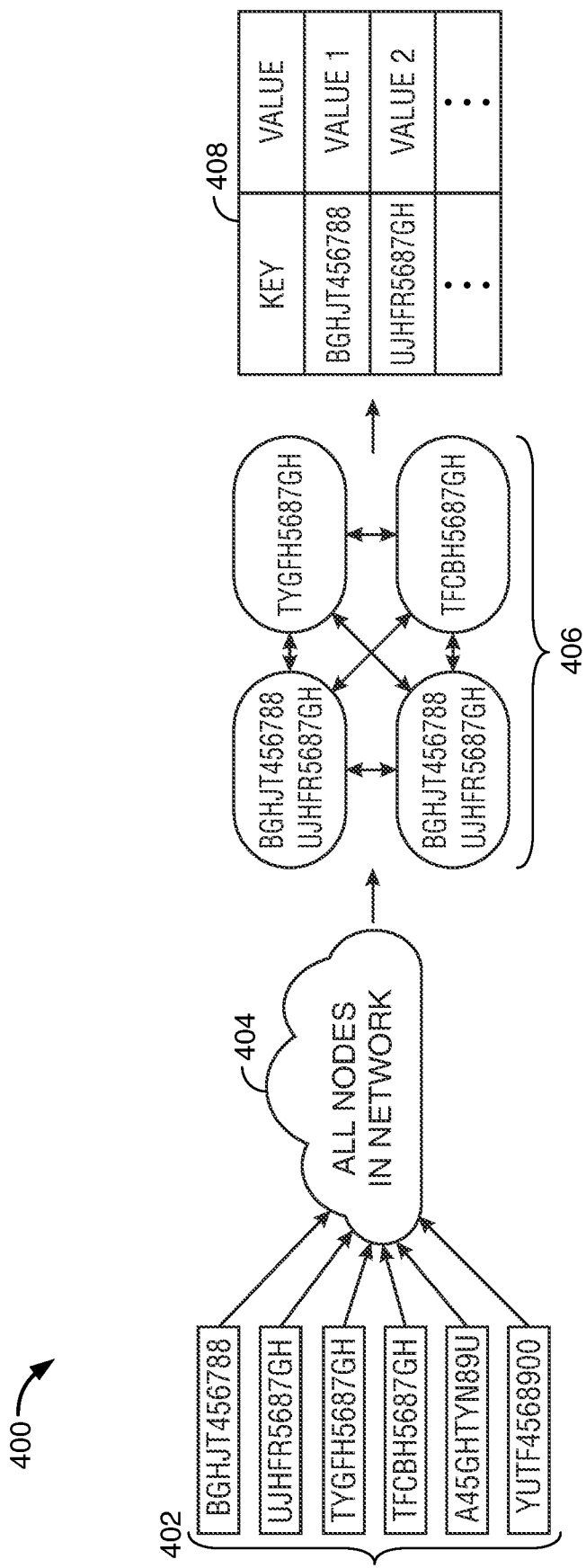
FIG. 4 shows an illustrative process flow in accordance with principles of the disclosure.

FIG. 4 shows illustrative process flow 400 for the integrated distributed hash table. The biometric data and e-check data may be inserted into the hash table as a key/value pair. The DHT may function as a large and complex key/value store. Keys 402 may be distributed among various nodes 404 throughout the network. In response to validation of a key, overlay network 406 may be used to locate a stored key. At 408, a hashing algorithm may map each key to a corresponding value.

Thus, methods and apparatus for SECURE ELECTRONIC CHECK CLEARANCE PLATFORM WITH INTEGRATED DISTRIBUTED HASH TABLE are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for expedited electronic check (e-check) processing at a universal clearance platform having an integrated distributed hash table, the method comprising:
   uploading a biometric marker and e-check data to the clearance platform;
   minting the biometric marker as a first non-fungible token (NFT) and the e-check data as a second NFT;
   inserting the first NFT and second NFT as a key-value pair in the distributed hash table, wherein the key is the first NFT comprising the biometric marker and the value is the second NFT comprising the e-check data;
   validating the biometric marker key against previously captured biometric information;
   mapping a key first NFT comprising the validated biometric marker key to a value second NFT comprising the e-check data value via an overlay network associated with the distributed hash table;
   validating the e-check data against a previously captured transaction history to clear the e-check; and
   in response to e-check clearance, routing the e-check data to the ACH automated clearing house (ACH) network to complete the transfer.

2. The method of claim 1, further comprising watermarking the biometric marker and the e-check data using wavelet transforms.

3. The method of claim 1, further comprising performing liveness detection on the biometric marker prior to upload.

4. The method of claim 1, further comprising validating the e-check data value using one or more machine learning algorithms.

5. The method of claim 1, further comprising mapping the key first NFT comprising the biometric marker to the value second NFT comprising the e-check data using a message digest hashing algorithm.

6. The method of claim 1, wherein the platform is configured to provide clearance for e-check transaction types represented by ACH standard entry class codes comprising CCD (corporate credit or debit entry), PPD (prearranged payment and deposit), TEL (telephone-initiated entry) and WEB (internet-initiated entry).

7. The method of claim 6, wherein the platform replaces authorizations associated with ACH standard entry class codes comprising CCD, PPD, TEL and WEB with a universal authorization based on the key first NFT comprising the biometric marker.

8. One or more non-transitory computer-readable media storing computer-executable instructions which, when executed by a processor on a computer system, perform a method for expedited electronic check (e-check) processing using a universal security protocol, the method comprising:
   uploading a biometric marker and e-check data to a clearance platform;
   minting the biometric marker as a first non-fungible token (NFT) and the e-check data as a second NFT;
   using a hash function, inserting the first NFT and second NFT as a key-value pair in a distributed hash table, wherein the key is the first NFT comprising the biometric marker and the value is the second NFT comprising the e-check data;
   validating the biometric marker against previously captured biometric information;

mapping a key first NFT comprising the validated biometric marker key to a value second NFT comprising the e-check data via an overlay network associated with the distributed hash table;

validating the e-check data against a previously captured transaction history to clear the e-check; and in response to e-check clearance, routing the e-check data to the automated clearing house (ACH) network to complete the transfer.

9. The media of claim 8, further comprising watermarking the biometric marker and the e-check data using wavelet transforms.

10. The media of claim 8, further comprising performing liveness detection on the biometric marker prior to upload.

11. The media of claim 8, wherein the platform is configured to provide clearance for an e-check transaction type represented by an ACH standard entry class code comprising one of CCD (corporate credit or debit entry), PPD (prearranged payment and deposit), TEL (telephone-initiated entry) and WEB (internet initiated entry).

12. The media of claim 11, wherein the platform replaces an authorization associated with the ACH standard entry class code with a universal authorization based on the key first NFT comprising the biometric marker.

13. A system for expedited electronic check (e-check) processing using a universal security protocol, the system comprising:
a first processor configured to:
in response to initiation of an e-check protocol, capture a biometric input associated with a payor; and
upload the biometric input and e-check data to a clearance platform;
a second processor associated with the clearance platform and configured to:
mint the biometric input as a first non-fungible token (NFT) and the e-check data as a second NFT;
insert the first NFT and second NFT as a key-value pair in a distributed hash table integrated with the platform, wherein the key is the first NFT comprising the biometric input and the value is the second NFT comprising the e-check data;
validate the biometric input against previously captured biometric information;
map a key first NFT comprising the validated biometric input to a value second NFT comprising the e-check data via an overlay network associated with the distributed hash table;
validate the e-check data using one or more machine learning algorithms and output an e-check clearance; and
in response to e-check clearance, transmit the e-check data to the automated clearing house (ACH) network to complete the transfer; and
a third processor configured to deposit funds corresponding to an e-check amount in a payee account.

14. The system of claim 13, the first processor further configured to perform liveness detection on the biometric input prior to upload.

15. The system of claim 13, the second processor further configured to watermark the biometric input and the e-check data using wavelet transforms.

16. The system of claim 13, wherein the machine learning algorithms are trained using past transaction information associated with the payor.

17. The system of claim 13, the second processor further configured to map the key first NFT comprising the biometric input to the value second NFT comprising the e-check data value using a message digest hashing algorithm.

18. The system of claim 13, the platform providing clearance for e-check transaction types represented by ACH standard entry class codes comprising CCD (corporate credit or debit entry), PPD (prearranged payment and deposit), TEL (telephone-initiated entry) and WEB (internet-initiated entry).

19. The system of claim 18, the platform replacing authorizations associated with ACH standard entry class codes comprising CCD, PPD, TEL and WEB with a universal authorization based on the key first NFT comprising the biometric input.

* * * * *